No. 661,414.   
C. MÉLANÇON.  
STUBBLE SHAVER.  
(Application filed Oct. 3, 1898.)  
Patented Nov. 6, 1900.
(No Model.)
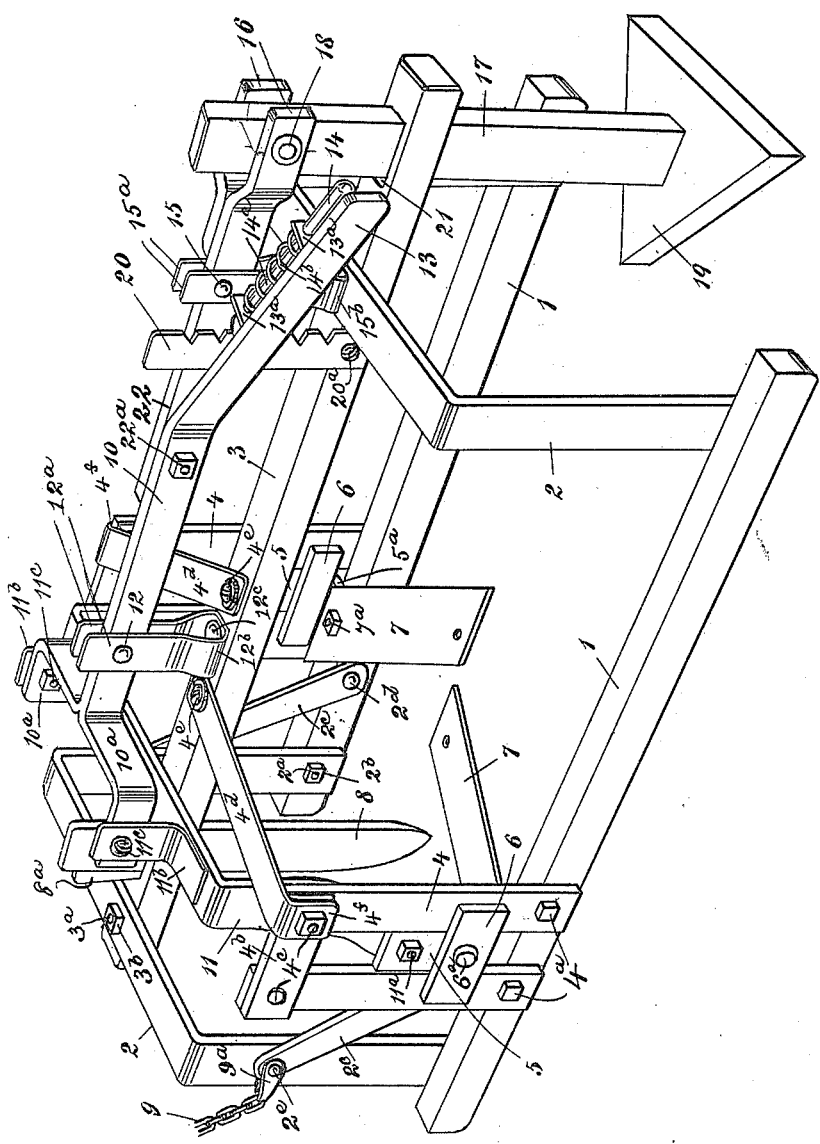
WITNESS:  
INVENTOR

UNITED STATES PATENT OFFICE.

CÉSAIRE MÉLANÇON, OF PLATTENVILLE, LOUISIANA.

STUBBLE-SHAVER.

SPECIFICATION forming part of Letters Patent No. 661,414, dated November 6, 1900.

Application filed October 3, 1898. Serial No. 692,572. (No model.)

*To all whom it may concern:*

Be it known that I, CÉSAIRE MÉLANÇON, a citizen of the United States, and a resident of Plattenville, in the parish of Assumption and State of Louisiana, have invented certain new and useful Improvements in Stubble-Shavers, of which the following is a specification.

My invention relates to an improvement in stubble-shavers comprising means for moving knives up and down at will while the machine is in motion, means for moving a fluke up and down while the machine is in motion, and means whereby both the knives and fluke are moved up and down with one hand at one and the same time by one and the same motion, all without stopping the machine, as hereinafter described and claimed.

In order that my invention may be fully understood, I will proceed to describe it with reference to the accompanying drawing, which is a perspective view of my improved stubble-shaver.

1 represents a pair of runners adapted to slip or slide over the surface of the ground, the machine being drawn by a team hitched thereto.

2 represents a pair of arched frames located one at each end of the runners and rigidly secured thereto by bolts $2^a$ and nuts $2^b$, so as to hold the runners the proper distance apart and the machine together.

$2^c$ represents forward braces secured to the runners by bolts $2^d$ at their lower ends and to the front arched frame by bolts $2^e$.

$9^a$ represents clevises coupled to the front arched frame by the upper bolts $2^e$ and with which is connected the draft-chain 9, whereby the team is attached to the machine.

3 is the main beam of the machine, supported beneath the arched frames 2 by bolts. At the front end the beam is supported by a bolt $3^a$ and nut $3^b$. Paired uprights or guides 4 are secured to the runners 1 by bolts $4^a$, and each pair is braced at its upper end by a cross-bar $4^b$, fastened by bolts $4^c$.

$4^d$ represents stay-bars attached by bolts $4^e$ at their inner ends to the beam and having at their outer ends downturned lips $4^f$, secured by the inner bolts $4^c$ to the inner uprights or guides of each pair of uprights or guides, respectively. Between the uprights or guides are located hangers 5, having lips $5^a$ and which are moved up and down between the uprights or guides and are held in place by slides 6, extending across the uprights or guides and secured by bolts $6^a$ to the hangers.

7 represents inwardly-projecting horizontal knives, which are fastened to the lips $5^a$ of the hangers 5 by bolts $7^a$ in rearwardly-inclined position, so as to shave or scrape shearwise. Suspended from the forward end of the main beam 3 in rear of the front arched frame 2 is a vertical knife or colter 8, secured by the key or wedge $8^a$. This vertical knife or colter works in front of the horizontal knives and cuts the ground in the center of the row.

10 is a main lever for raising and lowering the hangers carrying the horizontal knives. It is pivoted by a bolt 12 between the arms $12^a$ of a U-shaped post $12^b$, secured by a bolt $12^c$ to the beam.

11 is an arched hanger-frame connected at its lower ends to the respective hangers 5 by means of bolts $11^a$. To the top of this arched hanger-frame are secured angle-plates $11^b$, which are pivoted to the branches $10^a$ of the main lever 10 by bolts $11^c$.

13 is the handle of the lever, carrying a U-shaped bracket $13^a$, in which is mounted a pawl $14^a$, having a handle 14. This pawl is thrown by a spring $14^b$ and is adapted to engage the teeth of a ratchet-bar 20, secured by a bolt $20^a$ to the beam, so that the elevation of the horizontal knives may be changed by adjusting the main lever by its handle and locking the handle by means of a pawl with the ratchet-bar.

22 is an auxiliary lever pivoted by a bolt $22^a$ at its forward end to the main lever, so as to be controlled by the latter. The auxiliary lever 22 is also pivoted by a bolt 15 between the arms $15^a$ of a U-shaped post $15^b$, secured to the rear arched frame 2.

16 is the forked rear end of the auxiliary lever, on which is suspended by means of a bolt 18 an upright 17, passing through an opening 21 in the beam and carrying at its lower end a fluke 19, which moves along over the ground and spreads the dirt apart, throwing it on each side, so as to get it away from the cane or stubble.

The machine is used in the cultivation of sugar-cane. The ends or tops of stubble-cane need to be cut off and the dirt taken away, so that the living roots of the cane may receive heat and light, and my machine accomplishes these ends. Besides this, it is often necessary to remove earth which has been placed over plant-cane, and my machine is also useful for this purpose. In short, my machine is adapted to scrape away and remove earth and to level down a row, at the same time cutting off or shaving stubbles when the latter operation is necessary. This point will be understood by considering the cutter-knife 8. There is no occasion to alter the position of this knife; but should it be desired to have it cut more or less deeply the key or wedge which holds it in place would be knocked out, the cutter adjusted to the desired height, and the key or wedge replaced, after which the machine would again be ready for work. The arrangement of the present machine as to knives 7 dispenses with any such troublesome and difficult adjustment of parts.

At present in stubble-shavers of this sort the fluke 19 is placed permanently in position, (like the cutting-knife 8,) and in order to place it on a different level as compared with the runners it is necessary to unscrew clamps, knock out wedges or keys, or otherwise disarrange the parts holding it in place, all as explained above in reference to knives 7, whereas with the present machine the level of the fluke may be adjusted at will by the person who holds the handle 13 of the lever 10, as it is perfectly easy by moving the small handle near the lever 13 to withdraw the pawl 14ª from the ratchet 20, and then to move the handle up and down until the knives and the fluke are placed at the desired level, when the pawl 14ª is allowed to enter one of the notches of the ratchet 20, and then holds the lever 10 at the place desired. Inasmuch as this lever controls the height of the fluke and knives, it is evident that they may be moved up or down at will while the machine is in motion.

Having thus described my invention, the following is what I claim as new therein and desire to secure by Letters Patent:

1. A stubble-shaver comprising a main frame, the paired uprights supported by the frame, the hangers guided between the uprights, the horizontal knives supported by the hangers, the arched hanger-frame on which the hangers are supported, and means for raising and lowering the hanger-frame at will.

2. A stubble-shaver comprising a pair of runners, front and rear arched frames secured to the runners, a central beam supported by the arched frames, the paired uprights, the hangers guided between the uprights, the horizontal knives supported by the hangers, the arched hanger-frame to which the hangers are secured, the main lever from which the hanger-frame is suspended, and a pawl-and-ratchet device for securing the main lever in desired position.

3. A stubble-shaver comprising a pair of runners, front and rear arched frames secured to the runners, a central beam supported by the arched frames, the main lever, the auxiliary lever pivoted to the main lever, the fluke suspended from the auxiliary lever and a pawl-and-ratchet device for locking the main lever in desired position.

4. A stubble-shaver comprising a pair of runners, front and rear arched frames secured to the runners, a central beam supported by the arched frames, the paired uprights, the hangers guided between the uprights, the horizontal knives supported by the hangers, the arched hanger-frame to which the hangers are secured, the main lever from which the hanger-frame is suspended, the auxiliary lever pivoted to the main lever, the fluke suspended from the auxiliary lever, and a pawl-and-ratchet device for locking the main lever in desired position.

In testimony whereof I affix my signature in presence of two witnesses.

CÉSAIRE MÉLANÇON.

Witnesses:
J. B. CROCHET,
THEODORE MÉLANÇON.